U G. WEIDMAN.
SPRING WHEEL.
APPLICATION FILED MAY 16, 1912.
1,060,147.
Patented Apr. 29, 1913.
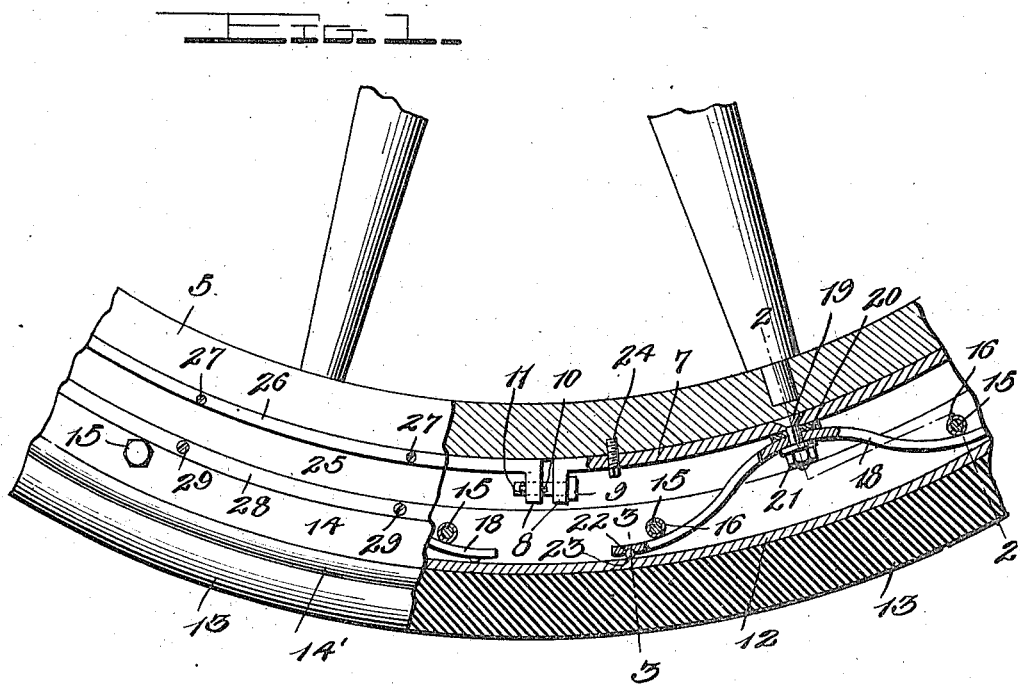
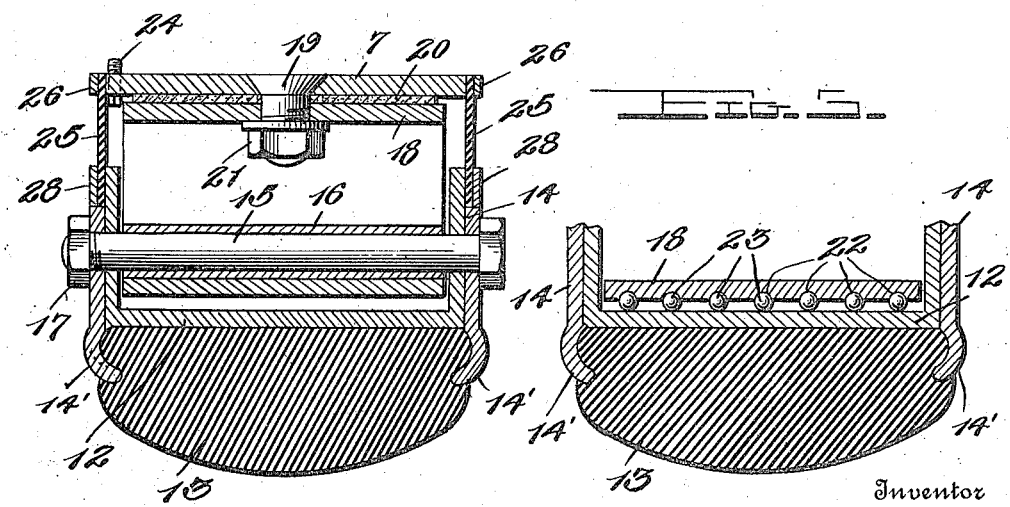
Witnesses
Chas. L. Giesbauer
A. B. Norton
Inventor
U G. Weidman,
By Watson E. Coleman
Attorney

UNITED STATES PATENT OFFICE.

U GRANT WEIDMAN, OF INDIANAPOLIS, INDIANA.

SPRING-WHEEL.

1,060,147.   Specification of Letters Patent.   Patented Apr. 29, 1913.

Application filed May 16, 1912. Serial No. 697,754.

*To all whom it may concern:*

Be it known that I, U GRANT WEIDMAN, a citizen of the United States, residing at Indianapolis, in the county of Marion and State of Indiana, have invented certain new and useful Improvements in Spring-Wheels, of which the following is a specification, reference being had to the accompanying drawings.

This invention relates to improvements in spring wheels and has for its primary object to provide a device of this character whereby a wheel having a maximum of resiliency is obtained, with the utilization of a minimum number of elements which may be manufactured and assembled in a completed wheel at comparatively small cost.

A further and more specific object of the invention resides in the provision of an annular rim of channel form in cross section, a plurality of leaf springs arranged between the felly of the wheel and the rim, the ends of said springs being disposed in the channel of the rim, and antifriction members arranged between the ends of the springs and the base of the channel to eliminate friction upon the springs when the same are subjected to load pressure.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing in which—

Figure 1 is a fragmentary side elevation partly in section of a wheel embodying the present invention; Fig. 2 is a section taken on the line 2—2 of Fig. 1; and Fig. 3 is a section taken on the line 3—3 of Fig. 1.

Corresponding and like parts are referred to in the following description and designated in the accompanying drawings by like reference characters.

Referring in detail to the drawing 5 designates the felly of a wheel which may be constructed of wood, metal, or a combination of wood and metal or other materials. The outer peripheral face of this wheel felly is provided with a groove or channel indicated at 6 to receive the metal band 7. The ends of this band are spaced apart and provided with ears 8 having openings through which a bolt 9 is adapted to be disposed. This bolt is provided with a longitudinal slot 10 to receive a wedge shaped key 11. When this key is driven into the slot of the bolt, the ends of the metal band 7 are drawn together and said band tightly clamped in the groove of the wheel felly.

The annular rim 12 of the wheel is normally disposed in spaced concentric relation to the wheel felly, and is of channel form in cross section, the flanges of said channel-shaped rim extending inwardly. A solid tread 13 of rubber or other resilient material is arranged upon the rim 12 and is securely retained in position by means of the annular plates 14 which are arranged upon the side flanges of the rim and are curved or bent at one of their edges as shown at 14' for engagement in grooves provided in opposite sides of the tread 13. These tread securing plates are rigidly fixed upon the annular rim 12 by means of the transverse bolts 15 which are disposed at intervals through openings provided in the side flanges of said rim and through coinciding openings in the plates 14. These bolts are spaced from the base or transverse body portion of the channel shaped rim and sleeves 16 are loosely mounted upon these bolts. The bolts 15 are of course provided with threads upon one of their ends to receive the nuts 17 whereby the tread retaining plates 14 are rigidly secured to the rim.

At intervals between the metallic band 7 which is arranged upon the wheel felly and the rim 12, the bowed leaf springs 18 are arranged. These springs are secured intermediate of their ends to the band 7 by means of the bolts 19 which are provided with flared heads countersunk in said band. Between the metallic band 7 and the springs 18 and preferably extending the entire width of the springs the fiber sheets 20 are disposed to eliminate friction upon said springs when the same are placed under pressure. Upon the outer ends of the spring securing bolts 19 suitable nuts 21 are threaded. The ends of the springs 18 extend between the side flanges of the rim 12 and beneath the loosely mounted sleeves 16 which are arranged upon the bolts 15. These sleeves permit of the free longitudinal movement of the ends of the springs when the same are subjected to load pressure, and in order to eliminate friction between the springs and the base of the channel shaped rim, I provide the outer faces of the spring plates at their ends with a plurality of pockets or recesses 22 to receive a series of anti-friction balls 23. These balls rotate upon the inner face of the body of the rim, and maintain the ends of the springs in slightly spaced relation thereto, thereby entirely eliminating friction upon the springs and greatly prolonging their usefulness.

As additional securing means for the metal band 7 set screws 24 are threaded in said band adjacent to its longitudinal edges and are adapted to engage in threaded sockets or recesses provided in the base of the channel or groove in the wheel felly.

Annular strips of rubber, canvas or other material indicated at 25 extend between the edges of the metal band 7 and the side flanges of the wheel rim 12. Rings 26 are arranged upon one edge of these flexible strips and are secured by means of the screws 27 to the edges of the band 7. Similar annular plates 28 are also arranged upon said flexible strips and are secured by means of the screws 29 to the side flanges of the channel shaped rim 12. These flexible strips of material permit of the inward movement of the wheel rim toward the felly 5 but limit the outward movement of said wheel rim. They also afford protection for the leaf springs, and prevent mud or other foreign material entering between the side flanges of the rim and interfering with the proper action of said springs.

From the foregoing it is thought that the construction and manner of operation of my improved spring wheel will be clearly understood.

A wheel constructed in accordance with the present invention may be adapted for use upon automobiles, motor trucks and similar vehicles. Owing to the few parts employed in the construction of the device, it will be obvious that the same is extremely strong, and durable in construction, and may be produced at comparatively small cost.

While I have shown and described the preferred construction and arrangement of the various elements, it will be understood that the invention is susceptible of considerable modification without departing from the essential features or sacrificing any of the advantages thereof.

Having thus described the invention what is claimed is:

1. The combination with a wheel having a felly provided with a groove in its peripheral face, of a band seated in said groove, means for clamping the band upon the felly, a plurality of set screws threaded in said band for engagement with the wheel felly, a rim of channel form in cross section normally disposed in spaced concentric relation to the felly, flexible strips extending between the side flanges of the rim and the edges of said metal band, annular securing plates arranged upon said flexible strips and securing means to rigidly secure the same to the rim and band respectively, a plurality of springs fixed at their intermediate portions to said metal band, the ends of said springs being disposed between the flanges of said rim and bearing against the same, and fiber sheets interposed between said springs and the metal band.

2. The combination with a wheel having a felly provided with a groove in its peripheral face, of a band seated in said groove, means for clamping the band upon the felly, a rim of channel form in cross section normally disposed in spaced concentric relation to the felly, transverse bolts connecting the side flanges of the rim, sleeves loosely mounted on said bolts, a plurality of springs secured intermediate their ends to said band, anti-friction means arranged between the felly and the springs, the ends of the springs extending beneath the sleeves, and anti-friction members arranged between the ends of the springs and the body of the rim.

3. The combination with a wheel having a felly provided with a groove in its peripheral face, of a band seated in said groove, means for clamping the band upon the felly, a rim of channel form in cross section disposed in spaced concentric relation to the felly, transverse bolts connecting the side flanges of the rim, sleeves loosely mounted on said bolts, a plurality of springs secured intermediate their ends to said band, anti-friction plates arranged between the felly and the springs, the ends of the springs extending beneath the said sleeves, a plurality of anti-friction members arranged between the ends of the springs and the body of the rim in spaced relation to one another.

In testimony whereof I hereunto affix my signature in the presence of two witnesses.

U GRANT WEIDMAN.

Witnesses:
Frederick J. Grumme,
Hayden R. Shearer.

Copies of this patent may be obtained for five cents each, by addressing the "Commissioner of Patents, Washington, D. C."